Figure 1:
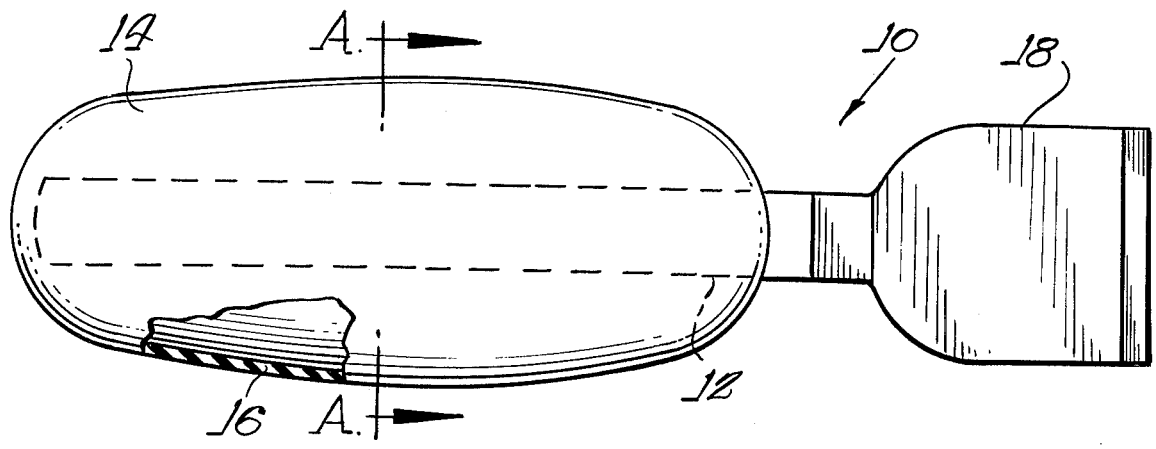

United States Patent

Russell

[11] 4,106,197
[45] Aug. 15, 1978

[54] ICE CREAM SPOON

[76] Inventor: Charles E. Russell, 5N343 Powis Rd., Wayne, Ill. 60184

[21] Appl. No.: 793,823

[22] Filed: May 5, 1977

[51] Int. Cl.² .................................. A47J 43/28
[52] U.S. Cl. ................................ 30/324; 425/276
[58] Field of Search .................. 30/324, 343, 140; 425/276

[56] References Cited

U.S. PATENT DOCUMENTS

| 730,921 | 6/1903 | Joest | 30/343 |
| 3,358,619 | 12/1967 | Pareira | 30/324 |
| 3,991,465 | 11/1976 | Cross | 30/324 |

FOREIGN PATENT DOCUMENTS 526,022  9/1940  United Kingdom ............ 30/140

Primary Examiner—Jimmy C. Peters

[57] ABSTRACT

The invention relates to an ice cream spoon, comprising a highly heat conductive bowl and shaft assembly, in which the shaft portion of the assembly is embedded in a handle portion of a lightweight heat resistive material enclosed in a layer of heat insulating material.

1 Claim, 3 Drawing Figures

ICE CREAM SPOON

This invention relates to an ice cream spoon which is extremely simple, inexpensive and effective.

Ice cream scoops, or dippers, are known and extensively used, particularly in ice cream parlors, restaurants and the like for the purpose of preparing servings of uniform size, shapes and amounts in order to secure non-waste and economy in the sale and distribution of the ice cream. Usually scoops, or dippers, of this kind cannot be efficiently or readily used directly for cutting hard frozen ice cream; rather, a block of the hard frozen ice cream freshly removed from the freezer must be allowed to "sit" for awhile, until it has softened sufficiently to be cut without application of excessive force. Even if such a softening period is of comparatively brief duration, the formation of a liquid pool of melted ice cream around the base portion of the solid ice cream block is unavoidable, and this melted ice cream is usually objectionable for inclusion with the servings and bothersome for re-freezing, the result being that it is frequently discarded and wasted.

Although the inventive ice cream spoon may be used even under circumstances outlined above in order to prevent or reduce such waste, it is particularly advantageous in cases, such as at home meals or parties, where the exact shape or amount of a serving is of less importance, while ease, convenience and speed of the cutting procedure, without opportunity for appreciable formation of meltings, are still highly desirable. The requirements for low manufacturing costs and high efficiency are, of course, even more pronounced in cases of this kind.

The invention represents an ideal solution of the abovementioned problems and eliminates or diminishes the disadvantages heretofore encountered in this connection by providing an ice cream spoon comprising a highly heat conductive bowl and shaft assembly with the shaft portion embedded in a solid mass of light-weight metal, such as aluminum or an aluminum alloy, in the form of a handle to be conveniently held in one hand, said handle being hermetically enclosed in a thin cover of a highly heat insulating material, such as rubber or plastics.

Figure 2:
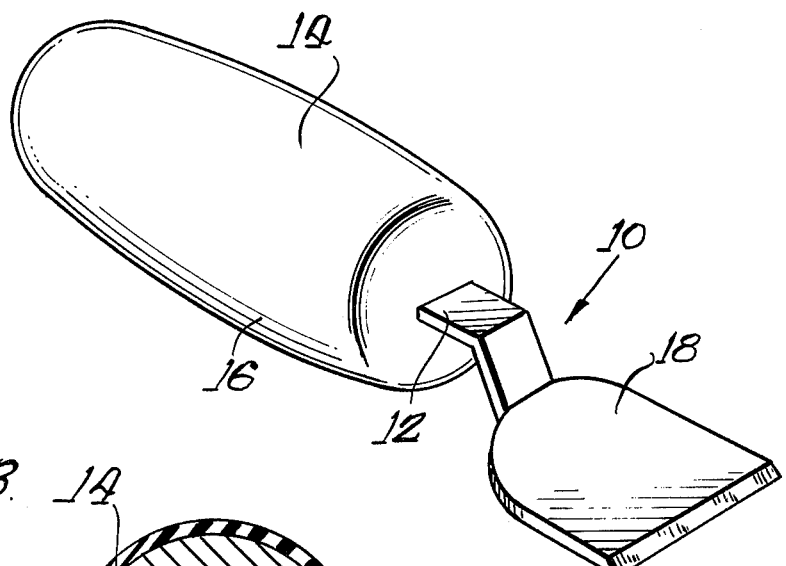
Figure 3:
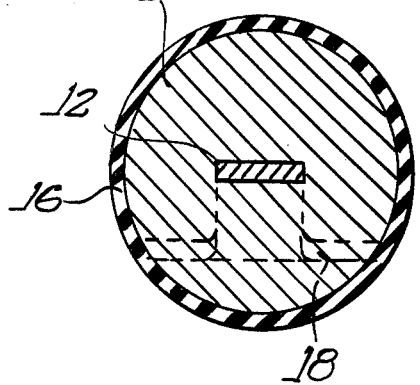

An embodiment of the invention is described in detail below with reference to the accompanying drawing, in which:

FIG. 1 is a top (or bottom) view of the ice cream spoon according to the invention, FIG. 2 is a perspective view of the spoon, and FIG. 3 is a cross-sectional view on line A—A of FIG. 1.

In the embodiment of the ice cream spoon shown in the drawing the elongate shaft portion 12 of a spoon 10 is embedded in a handle-shaped body 14 of a light-weight aluminum material, preferably cast directly around said shaft portion 12. Said body 14 is, in turn, entirely surrounded by a layer 16 of heat insulating material which may consist of a suitable rubber or plastics material. The actual shape of the spoon 10 and its parts may vary considerably. For example, the bowl 18 of the spoon may be in the shape of a scoop or an ordinary table spoon, or it may be shallow enough to approach the shape of a flat spatula, while the aluminum body 14 may be round or oval in cross-section with or without transverse grooves entirely or partly around said body to provide for easy and safe gripping of the same with one hand. The insulating cover 16 may be applied by dipping, spraying or any other suitable method. The bowl 18 and shaft 12 are preferably made of a single piece of stainless steel.

The spoon is readily and inexpensively manufactured by first forming the bowl and shaft portion as by forging, then using said portion as a core in a casting mold for the light-weight metal portion, and finally applying the cover portion.

In operation, when a portion is to be cut from a mass of hard frozen ice cream, the spoon is first immersed in water for about two minutes, the temperature of the water preferably being about 180° F. When removed from the water, the insulating cover 16 practically immediately cools sufficiently to be comfortably held in the hand, while the bowl 18 remains hot enough to cut through the hardest ice cream with very little pressure applied, and heat is stored in the aluminum body 14 and gradually conveyed through the shaft 12 to make up for loss of heat by the bowl 18. Thus, a number of cuts can be made, before the bowl has cooled off to a temperature that is too low to permit easy cutting of the ice cream mass.

It is noted that the cutting edges of the bowl 18 need not be sharp, since even with a dull edge the heated spoon cuts the hard frozen ice cream with great ease and without application of appreciable pressure, leaving smooth surfaces on the ice cream portions. The shape of the bowl, shaft and handle portions may vary within wide limits to suit different tastes and specific uses, and the same applies to color and appearance of the outside of the handle insulating cover. If for any reason desirable, the bowl portion may, of course, form a separate element connectible by any suitable means to the shaft portion protruding from the handle, as long as the connection between the bowl and shaft portions is freely heat conductive. Other modifications are feasible within the scope of the attached claims.

What I claim is:

1. An ice cream spoon, particularly for rapidly and effortlessly cutting serving portions from a block of hard frozen ice cream, comprising
   a. a blade or scoop member of stainless steel,
   b. an elongate shaft or tang member of stainless steel extending outwardly from said blade member and forming with the same a solid unit of highly heat-conducting characteristics throughout all sections thereof,
   c. a handle made from a lightweight material of high heat accumulating capacity, surrounding said shaft member and being rigidly and securely attached thereto in free heat-conducting relationship therewith, said handle being of maximum size for convenient gripping with one hand, and
   d. a thin heat-insulating layer hermetically enclosing said handle to protect the user's hand from excessive heat, whereby the entire spoon may be briefly immersed in a hot water bath and thereby heated, with a great proportion of the heat stored in said handle material for subsequent conduction to said blade portion of the spoon upon removal of the spoon from said hot water bath.

* * * * *